United States Patent [19]

Tyler

[11] 4,021,343
[45] May 3, 1977

[54] WATER PURIFIER

[76] Inventor: Truman V. Tyler, 10107 Stone Arch Drive, Grass Valley, Calif. 95945

[22] Filed: June 2, 1975

[21] Appl. No.: 582,791

[52] U.S. Cl. .............................. 210/110; 210/134; 210/257 M; 210/433 M
[51] Int. Cl.² ...................................... B01D 31/00
[58] Field of Search ........ 210/23 H, 257 M, 321 R, 210/433 M, 110, 134

[56] References Cited

UNITED STATES PATENTS

| | | | |
|---|---|---|---|
| 3,493,496 | 2/1970 | Bray et al. | 210/257 M |
| 3,630,378 | 12/1971 | Bauman | 210/257 M |
| 3,679,055 | 7/1972 | Clark et al. | 210/321 R X |
| 3,688,911 | 9/1972 | Baerg | 210/321 R |
| 3,746,640 | 7/1973 | Bray | 210/433 M X |
| 3,794,172 | 2/1974 | Bray | 210/257 M |
| 3,794,173 | 2/1974 | Bray | 210/433 M X |
| 3,831,757 | 8/1974 | Gossett et al. | 210/257 M X |

*Primary Examiner*—Frank A. Spear, Jr.
*Assistant Examiner*—Robert H. Spitzer
*Attorney, Agent, or Firm*—Gausewitz, Carr & Rothenberg

[57] ABSTRACT

This invention provides an arrangement for delivering purified water on demand, which includes a reverse osmosis filter having an inlet for connection to a source of pressurized water, and a purified water outlet connected to a tank where the purified water enters a bladder. Unpurified water from the filter is connected to the tank on the outside of the bladder for forcing purified water through a purified water outlet. This connection also includes a restricted passageway to a drain. A second discharge for unpurified water from the reverse osmosis filter connects through another restrictor to the drain. The system is controlled by an actuator which operates a valve to control the flow of unpurified water, thereby causing the same to force purified water from the tank to the purified water outlet, and a valve for controlling the flow of inlet water to the reverse osmosis filter, shutting off such flow when the tank is filled with purified water.

17 Claims, 11 Drawing Figures

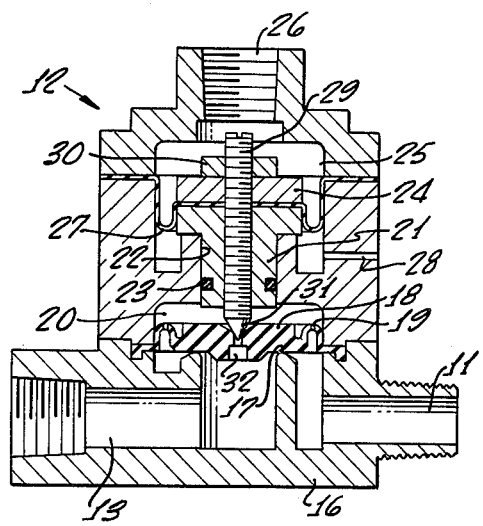
FIG. 2.
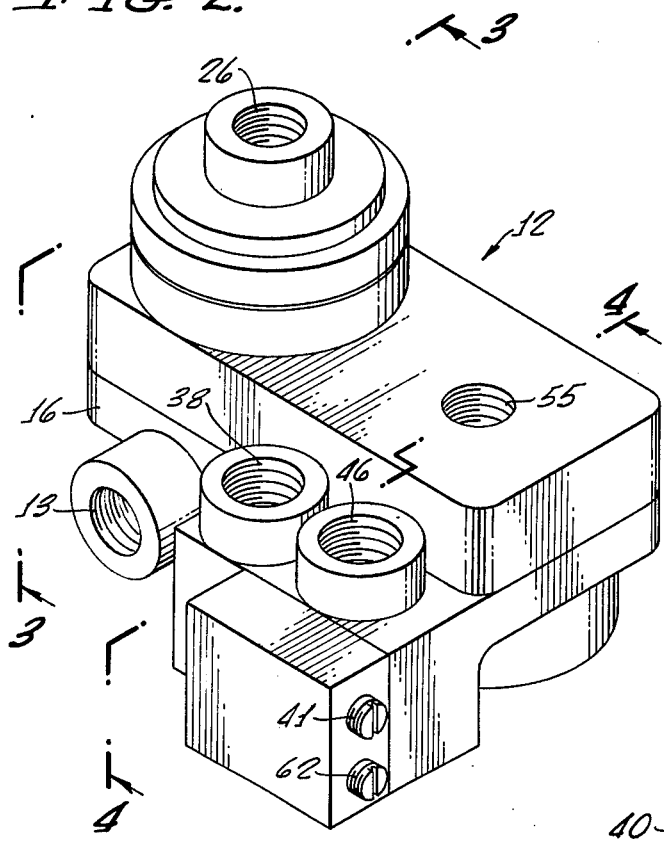
FIG. 3.
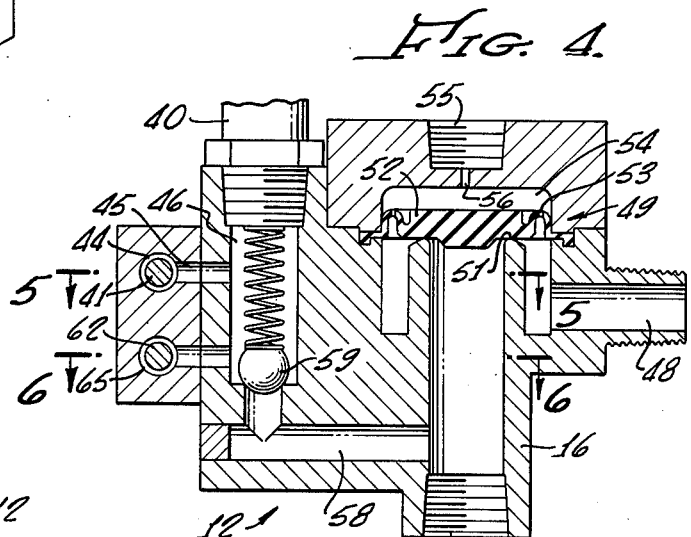
FIG. 4.
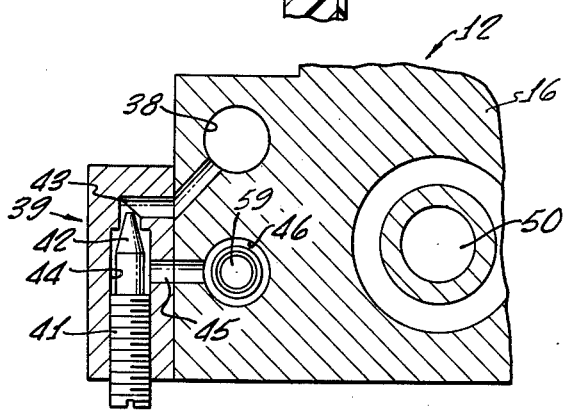
FIG. 11.
FIG. 5.
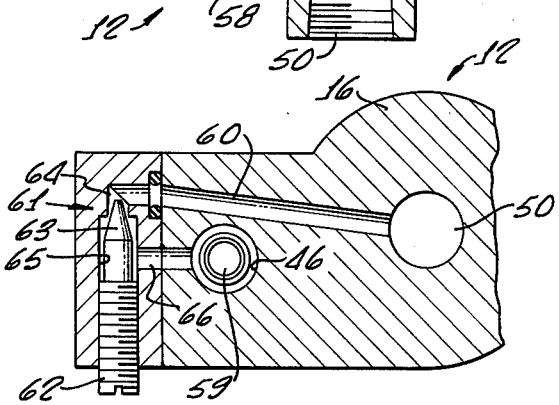
FIG. 6.

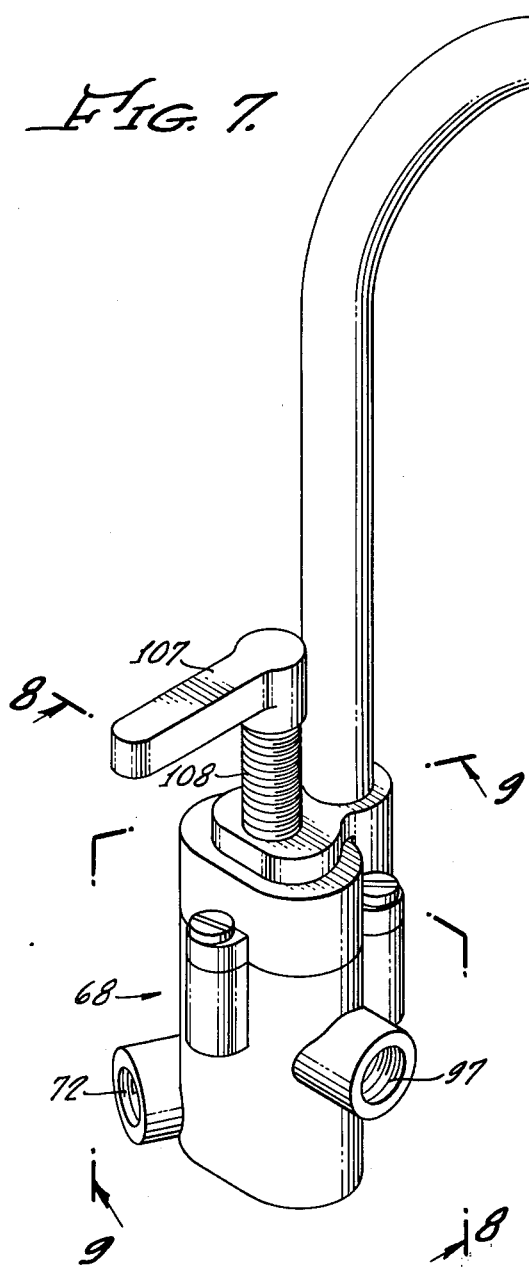
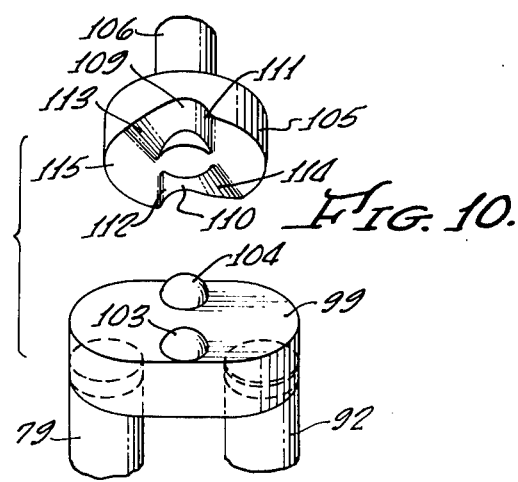
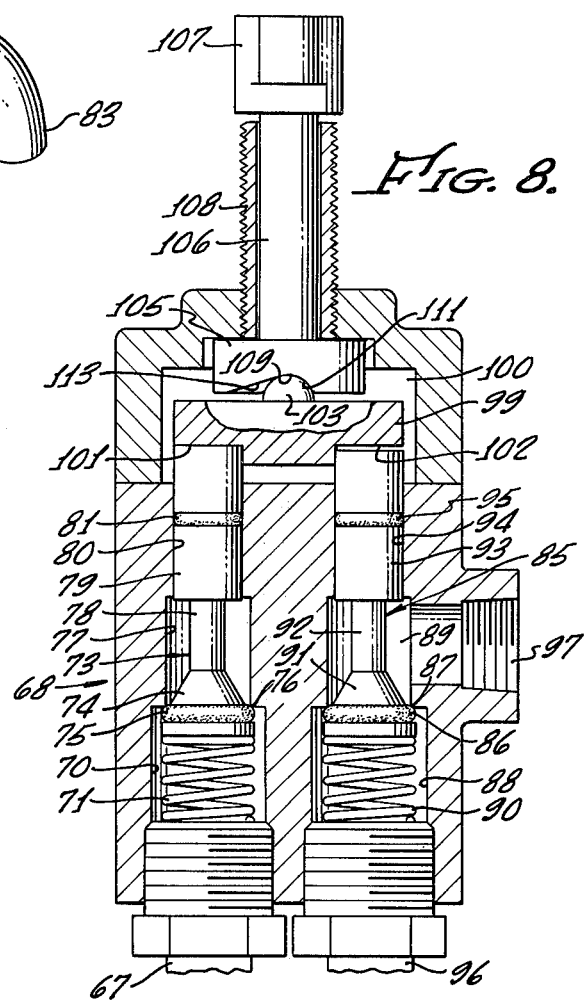
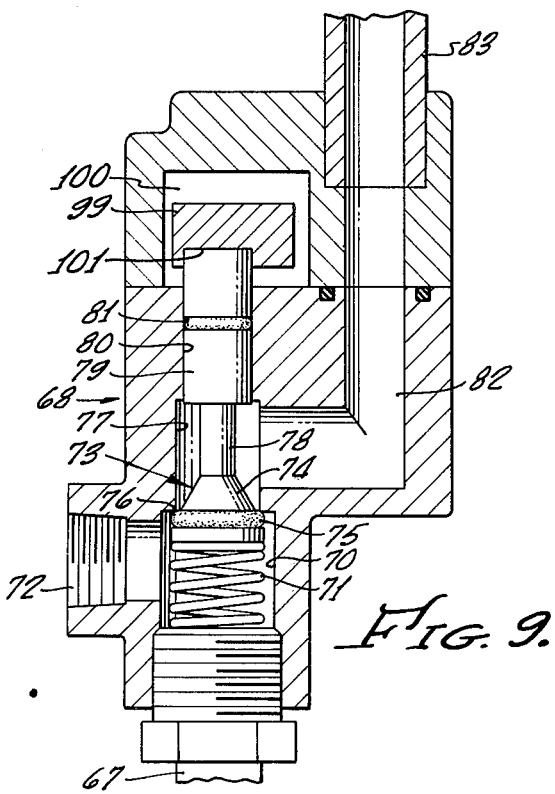

WATER PURIFIER

BACKGROUND OF THE INVENTION

1. Field of the Invention

This invention relates to a device for producing purified water.

2. Description of the Prior Art

An increasing use has developed in home, factory and office for units to provide purified water from ordinary tap water, making use of a reverse osmosis filter. These filters produce purified water which is very good for drinking or other purposes, as well as a larger quantity of unpurified water containing contaminates. Because of the slow rate of flow of purified water through these filters, the purifying systems include storage tanks to retain the purified water, and controls for directing the water to and from the tanks. Provision also must be made for discharging the unpurified water from the filter.

Many of these designs are objectionably bulky and expensive. For example, it may be necessary to locate a storage tank above a sink for some of the units, which thereby become unsightly and take up valuable space. The water, once it passes through the reverse osmosis filter, frequently then is re-exposed to air with the opportunity of again becoming contaminated. Pressurized flow from the unit is not always available. Ordinarily, solenoid operated valves are incorporated in the purification unit requiring an expensive and complicated installation which involves electrical wiring, as well as plumbing. One unit, described in U.S. Pat. No. 3,719,593, has no means for shutting off the water supply so that there is a continual flow and a great waste of water.

SUMMARY OF THE INVENTION

The present invention provides a greatly improved water purifying unit which can be economically manufactured, is very simple to install, requires no electrical wiring, shuts off completely when the reservoir is filled with purified water and is compact so that it will fit beneath the sink or in other restricted and out-of-the-way places. The unit includes a reverse osmosis filter which connects to a storage tank feeding the purified water to the inside of a bladder within the tank. The discharged unpurified water from the reverse osmosis unit is conducted to the tank on the outside of the bladder for forcing the purified water to the purified water outlet. A valve in the unpurified water discharge line controls the flow to the tank outside of the bladder. A drain connection that includes a flow restrictor is located downstream of the valve, allowing the impure water within the tank to be displaced to the drain as the tank is filled with pure water. There is also an unpurified water discharge line with a second flow restrictor for allowing for the necessary discharge of impure water as purified water is supplied to the tank.

An inlet valve controls the supply of water to the reverse osmosis filter, this valve being opened by hydraulic pressure when the manually operable control for the unit is actuated. This actuation also opens the valve in the impure discharge water line for causing the discharge water to exert pressure on the exterior of the bladder and force the pure water to the pure water outlet. When the manual control is returned to its original position, the outflow of purified water is closed and the valve for the impure discharge water immediately is shut so that it no longer pressurizes the tank. However, the inlet valve remains open, allowing water to flow through the reverse osmosis filter to direct purified water into the tank. The inlet valve ultimately closes as a result of a pressure signal provided when the tank is entirely full of purified water, again having a full charge of water for delivery to the purified water outlet. At that point, all flow of water ceases. Automatic filling of the system thereby is accomplished and the inlet valve is controlled entirely by hydraulic pressure.

The valve in the impure water line can be made to operate directly by manual actuation, but preferably also is hydraulically operated. This avoids the need to extend the impure water line to the sink where the control is located, permitting the use of a smaller hydraulic line of reduced volume and less tendency to leak.

BRIEF DESCRIPTION OF THE DRAWINGS:

FIG. 2 is a fragmentary perspective view of the unit which houses the restrictors and certain of the valves;

FIG. 3 is a sectional view taken along line 3—3 of FIG. 2, illustrating the inlet valve;

FIG. 4 is a sectional view taken along line 4—4 of FIG. 2, showing the valve in the impure water line, as well as the relief valve and parts of the flow restrictors;

FIG. 5 is a sectional view taken along line 5—5 of FIG. 4;

FIG. 6 is a sectional view taken along line 6—6 of FIG. 4;

FIG. 7 is a perspective view of the unit from which the purified water is discharged and which incorporates the control valves;

FIG. 8 is a sectional view taken along line 8—8 of FIG. 7;

FIG. 9 is a sectional view taken along line 9—9 of FIG. 7;

FIG. 10 is an exploded fragmentary perspective view showing the cam arrangement for operating the control valves; and FIG. 11 is an enlarged fragmentary sectional view showing a portion of the wall of the tank and bladder.

DESCRIPTION OF THE PREFERRED EMBODIMENTS

Figure 1:
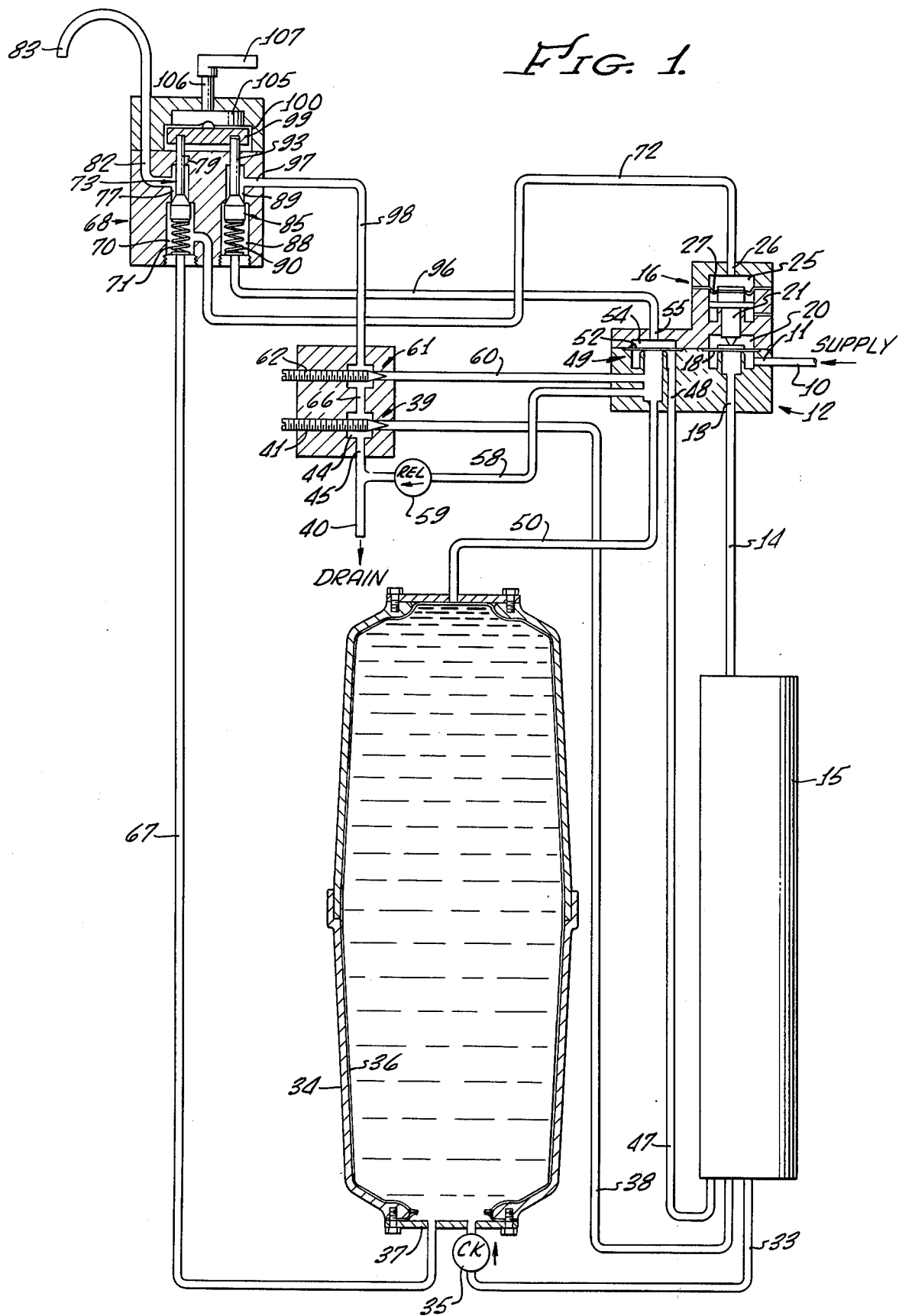
FIG. 1 is a schematic view of the water purifying system of this invention.

As shown in the schematic view of FIG. 1, water to be purified enters the system of this invention at line pressure through a line 10 which connectes to the inlet port 11 of a valve 12. The outlet 13 of this valve empties into a line 14 that extends to the inlet end of a reverse osmosis filter 15.

The valve 12, as may be seen in FIG. 3, conveniently is incorporated in a body 16 which houses other components of the system that will be described below. The valve 12 includes a seat 17 between the inlet 11 and outlet 13 engageable by one side of a diaphragm 18. Minute bleed openings 19, outside of the seat 17, extend through the diaphragm 18, providing communication between the inlet 11 and an enclosed chamber 20 above the diaphragm. A piston 21 is slidable in an opening 22 that extends to the chamber 20, being sealed by an O-ring 23 relative to the wall of the opening 22. The path of movement of the piston 21 is aligned with the axis of the diaphragm 18. The upper end portion 24 of the piston 21 is enlarged and received in a chamber 25 to which access is provided by a port 26. Within the chamber 25 is a diaphragm 27 which extends between the body 16 and the upper portion 24 of the piston 21, thereby dividing the chamber 25 inwardly of the port 26. A bleed opening 28 extends through the wall of the body 16 to the chamber 25 beneath the diaphragm 27.

Extending axially through the piston 21 is a threaded pin 29, held by a jam nut 30, which has a conical lower end 31. The latter portion of the pin 29 is engageable with the diaphragm 18 at a central opening 32 that extends through this diaphragm. This is the position shown in FIG. 3, with the pin end sealing off the opening 32 through the diaphragm 18. Also, in this position the diaphragm 18 is in engagement with the seat 17 so that flow from the supply line 10 into the system is blocked.

The reverse osmosis filter 15 is of conventional type, permitting a relatively slow flow through it of purified water and a substantially greater volume of impure discharge water. The purified product water leaves the filter 15 through a line 33 which connects to the lower end of a storage tank 34. A check valve 35 allows flow only from the filter 15 into the tank 34 through the line 33. Within the tank 34 is a bladder 36 which may be of relatively thin plastic and has a volume at least equal to that of the tank 34. The bladder 36 is connected to the tank 34 at the lower end of the tank by being held beneath an end plate 37. The remaining portions of the bladder 36 are unattached to the tank.

There are two outlets for the impure water from the reverse osmosis filter 15, one of these being provided by the line 38 that passes through a flow restrictor 39 and into a drain 40. The restrictor 39, as may be seen in FIG. 5, includes a threaded pin 41 having a tapered end 42 extending into a relatively narrow port 43 to which the line 38 connects. The flow restriction is provided by the tapered pin end 42 at the connection between the small port 43 and a larger downstream passage 44. Rotation of the pin 41 adjusts its position axially for varying the size of the restricted opening. From the passage 44, the restrictor 39 connects through a lateral port 45 to a larger passage 46 in the body 16, which leads to the drain 40. Alternatively, an orifice of preselected size may be used as the flow restrictor. The restrictor 39 controls the discharge of unpurified waste water from the reverse osmosis filter 15 when the tank 34 is being filled with purified water, so that there will be substantially a maximum flow through the filter membrane in providing pure water, but not an excessive amount of waste water conducted to the drain.

A second impure water outlet 47 extends from the reverse osmosis filter 15 to the inlet port 48 of a valve 49, also located in the body 16. Between the inlet port 48 and the main discharge passage 50 of this valve is a seat 51 engageable by a diaphragm 52, as shown in FIG. 4. Small bleed openings 53 extend through the diaphragm 52 outside of the valve seat 51, providing communication between the inlet port 48 and a chamber 54 above the diaphragm. A port 55, which includes an orifice 56, provides exterior access to the chamber 54 on the side of the diaphragm 52 opposite from the seat 51.

The main discharge passage 50 of the valve 49 connects to the upper end of the tank 34. This provides a connection for the filter waste water through the line 47, the valve 49 and the passage 50 into the tank 34 at the end opposite from the connection of the pure water line 33. The unpurified water entering the tank 34 through the passage 50 is on the outside of the bladder 36.

A passageway 58 extends from the passage 50 through a spring-loaded relief valve 59 in the passage 46 that connects to the drain 40. This guards against overpressurization of the tank 34, permitting flow through the passageway 58 only in abnormal circumstances where the pressure is sufficient to open the relief valve 59.

A secondary discharge passageway 60 extends from the passageway 50, downstream of the valve seat 51, connecting through a flow restrictor 61 to the drain 40. The restrictor 61 is similar to the restrictor 39, comprising a threaded pin 62 in the body 16, provided with a tapered end 63 intermediate a relatively small passage 64, to which the passageway 60 connects, and a larger passage 65 (see FIG. 6). By extending from the larger downstream passage 65 into the smaller upstream passage 64, the tapered pin end 63 restricts the flow of water from the passageway 60 through a lateral port 66 that connects to the passage 65 and into the passageway 46 that leads to the drain 40. An orifice of selected size could be used in lieu of the restrictor 61 in controlling the flow to the drain.

A pure water outlet 67 extends from the bottom of the tank 34, in communication with the interior of the bladder 36, to a control unit 68 where the pure water is discharged for use. The pure water line 67 connects to an inlet chamber 70 of the control unit 68, within which is a compression spring 71 bearing against the lower end of a poppet valve 73 (see FIGS. 8 and 9). Also connecting to the inlet chamber 70 is a line 72 which extends to the port 26 of the inlet valve 12 located above the diaphragm 27 of that valve. The poppet 73 includes a frustoconical lower portion 74 beyond which is an O-ring engageable with a seat 76 between the chamber 70 and a smaller chamber 77 downstream of the chamber 70. Above the frustoconical lower portion 74, the valve 73 includes a stem 78 beyond which is a larger cylindrical portion 79 slidable in an opening 80 with respect to which it is sealed by an O-ring 81. An outlet passageway 82 connects to the chamber 77 and leads to a spigot 83 where the purified water is taken for use.

A second poppet valve 85, similar to the valve 73, is included in the control unit 68. The poppet valve 85 includes an O-ring 86 which is engageable with a seat 87 between an enlarged inlet chamber 88 and a smaller chamber 89 downstream from the inlet. A compression spring 90 bears against the lower end of the valve member, biasing it toward the closed position where the O-ring 86 engages the seat 87. A frustoconical portion 91 of the valve member connects to a stem 92 above which is a cylindrical portion 93 slidable within a complementary opening 94. An O-ring 95 seals the cylindrical portion 93 with respect to the wall of the opening 94.

The inlet to the valve 85 is from a line 96 which connects to the port 55 of the valve 49 on the upper side of the diaphragm 52 of that valve. The outlet port 97 of the valve 85 connects through a line 98 to the drain 40.

An oblong plate 99 is positioned in a chamber 100 at the upper end of the control unit 68. The lower surface of the plate 99 includes recesses 101 and 102 which complementarily receive the upper ends of the cylindrical part 79 of the valve 73 and the cylindrical part 93 of the valve 85. On the upper side of the plate 99, between the recesses 101 and 102, are domed protrusions 103 and 104 which are hemispherical in shape.

Above the plate 99, in the chamber 100, is a rotary actuator 105 having an upwardly extending stem 106 to which a handle 107 connects, outwardly of the unit 68. The stem 106 extends through an exteriorly threaded tube 108 which, in conjunction with a nut (not shown) provides a means for attaching the unit 68 beneath a sink, with the handle 107 and spigot 83 above the sink.

Recesses 109 and 110 in the lower surface of the actuator 105 receive the protrusions 103 and 104, respectively. These recesses provide cam surfaces, having relatively steep walls 111 and 112 at one end, and more shallow walls 113 and 114 at the other end.

When the poppet valves are closed, the protuberances 103 and 104 are maintained in the central parts of the recesses 101 and 102 by the force of the compression spring 71 which pushes the poppet 73 against the plate 99. The upper end 93 of the valve 85 is made slightly shorter than the corresponding part 79 of the valve 73, however, so that there is a small clearance between the poppet 85 and the plate 99.

Rotation of the handle 107, which turns the stem 106 and thus the actuator 105, cams the protuberances 103 and 104 out of the recesses 109 and 110. This pushes downwardly on the plate 99 (which does not rotate), thereby reacting through the upper cylindrical portions 79 and 93 of the poppet valves 73 and 85, opening these valves together. Because of the clearance at the poppet 85, the opening of the valve 73 slightly precedes that of the valve 85.

An abrupt opening of the valves is caused if the actuator is moved counterclockwise from the position illustrated in FIG. 10, which causes the steeply sloped surfaces 111 and 112 to react against the protuberances 103 and 104 in opening the valves. Sufficient rotation will take the protuberances out of the recesses so that they bear against the undersurface 115 of the actuator 105, holding the valves in the open position. Rotation clockwise from the position of FIG. 10 causes the shallowly sloped surfaces 113 and 114 to be used in providing more gradual movement of the plate 99 for more slowly opening the valves.

In operation of the system to draw water from the spigot 83, the handle 107 is turned to open the control valves 73 and 85, thereby opening the lines 67, 72 and 96. Because of the lead given the valve 73, the lines 67 and 72 are opened initially. This relieves pressure from within the chamber 25 above the diaphragm 27 of the valve 12. The bleeding of pressure from the chamber 25 of the valve 12 allows the line pressure within the chamber 20 (which communicates with the inlet 11 by the bleed openings 19) to push the piston 26 upwardly, withdrawing the pin end 31 from the opening 32 in the diaphragm 18. This immediately relieves the pressure in the chamber 20 as a result of which the line pressure from the supply line 10, bearing against the underside of the diaphragm 18, pushes the diaphragm upwardly off of the seat 17. This opens the valve 12 so that inlet water is permitted to flow from the line 10, past the seat 17, through the outlet port 13 and the line 14, into the reverse osmosis filter 15.

The opening of the control valve 85 provides communication between the chamber 54 of the valve 49 and the drain 40, via the lines 96 and 98. This relieves pressure from above the diaphragm 52 of the valve 49. As a result, the diaphragm 52 is lifted off the seat 51 by the pressure in the impure water line 47. Consequently, the impure water is permitted to flow from the line 47, past the valve seat 51, and into the outlets 50 and 60 of the valve 49. Because of the restrictor 61 in the line 60, very little water can flow to the drain through that line. Flow through the diaphragm openings 53 into the chamber 54 and out through the line 96 is restricted by the orifice 56. Also, the impure water line 38 having the restrictor 39, will not transmit much volume to the drain. Therefore, substantial pressure will build up in the line 50, pressurizing the exterior of the bladder 36 in the tank 34. This squeezes the bladder 36 to displace the pure water from within the bladder out of the tank 34 and through the line 67 to the valve 73. The pure water passes through the opened valve 73 and the downstream valve passage 82 to enter the spigot 83 from which it is discharged. This produces a relatively high pressure to generate a suitable flow through the spigot 83 as the purified water is taken for use.

The substantial flow of water through the reverse osmosis unit 15, discharging through the waste water outlet 47, has the effect of flushing the filter, substantially prolonging its life.

The opening of the valve 73 slightly ahead of the valve 85 assures that the system inlet valve 12 always will be opened as well. It avoids a condition in which pressure in the pure water line 67 is transmitted through the line 72 so as to pressurize the diaphragm 27 and hold the valve 12 closed. If the valve 85 opened at the same time as the valve 73, the former valve, by allowing the valve 49 to open, would cause an immediate pressurization of the pure water in the tank 34, thus building up pressure in the line 67. This line communicates with the chamber 25 of the valve 12, via the valve chamber 70 and the line 72, and so could produce a pressure against the diaphragm 27 to hold the valve 12 closed. This can never occur with the control valve 73 leading the control valve 85, however.

When the handle 107 is returned to its original position, the compression springs 72 and 90 close the control valves 73 and 85. This, of course, immediately shuts off the flow of pure water from the spigot 83.

The closing of the valve 85, and hence the passageway 96, causes pressure to build up in the chamber 54 above the diaphragm 52 of the valve 49. This occurs because the water in the line 47 bleeds through the openings 53 in the diaphragm 52 and into the chamber 54 which then has its outlet blocked by the closed valve 85. This produces a greater pressure above the diaphragm 52 than below it where the water is flowing, bringing the diaphragm back to its seat 51, thereby closing the valve 49. It is held closed because there is a larger pressure area in the chamber 54 above the diaphragm 52 than there is in the inlet zone below the diaphragm. With the valve 49 closed, there is no longer communication from the line 47 to the tank 34 exteriorly of the bladder 36. However, the upper end of the tank, outside of the bladder 36, remains in communication with the drain 40 through the lines 50 and 60 and the restrictor 61, relieving the pressure on the outside of the bladder 36. Inlet water from the supply line 10 can continue to flow into the system, but at a slower rate. At the reverse osmosis filter 15 the water is divided into a stream of purified water that empties into the line 33 and unpurified water in the line 38. The line 47 is blocked at this time and so receives no water. The unpurified water in the line 38 flows through the restrictor 39 to the drain 40. The purified water passes the check valve 35, entering the bladder 36, which causes the water outside of the bladder to be displaced through the lines 50 and 60 to the drain 40. This flow continues until the bladder is entirely full and all the impure water on the outside of the bladder is displaced from the tank 34. When this condition is reached, pressure begins to build up in the purified water outlet line 67 because there is no place for the purified water to flow. This pressure is transmitted through the line 72 to the chamber 25 above the diaphragm 27 of the valve 12. The diaphragm 27 and upper piston end 24 present a relatively large pressure area, so that with a moderate amount of pressure build up in the chamber 25 the piston 21 is moved downwardly relative to the valve body. The bleed opening 28 in the valve body assures that the piston and diaphragm 27 will not be prevented from moving downwardly. This movement causes the tapered end 31 of the pin 29 to engage the diaphragm 18 at the opening 32, thereby closing that opening. Pressure from the inlet line 10 then is transmitted through the bleed openings 19 of the diaphragm 18 to the chamber 20 above this diaphragm, causing the diaphragm to be moved downwardly to engage the seat 17. The end 31 of the pin 29 is maintained in engagement with the diaphragm 18 at the opening 32 as this movement of the diaphragm occurs by virtue of the pressure in the chamber 25 and the large pressure area presented by the diaphragm 27 and the upper end 24 of the piston. Therefore, when the tank 34 becomes filled with purified water the entire system automatically shuts down and all flow of water ceases. The system then is ready to repeat the cycle described above whenever the control lever 107 is actuated to draw from the spigot 83. Also, the valves 12 and 49 will be opened to deliver purified water to the spigot 83 if the control valves 73 and 85 are opened prior to complete filling of the tank 34 with purified water.

Thus, the system of this invention provides complete and automatic cycling with the simple manipulation of the control lever. Purified water is available instantly for delivery under pressure, yet is stored in a sealed container with no air space, completely protected. No electronic controls are needed, yet the system operates rapidly and shuts off all flow when the tank is full. The components are relatively simple, compact and can be manufactured at a low cost. Other than in the purified water outlet line, there is no significant flow of water in the vicinity of the sink, the principal flow lines being grouped with the filter and storage tank. This helps simplify the system and minimize the possibility of leakage.

The foregoing detailed description is to be clearly understood as given by way of illustration and example only, the spirit and scope of this invention being limited solely by the appended claims.

I claim:
1. A water purifying device comprising
a reverse osmosis filter having an inlet for water to be purified, a purified water outlet and a waste water outlet,
a tank,
a movable member in said tank for dividing said tank into a first section and a second section of variable volumes,
means for connection to a source of water under pressure for conducting water to said inlet of said reverse osmosis filter,
a first valve means for controlling the flow of water to said inlet,
a first purified water passage connecting said purified water outlet of said reverse osmosis filter to said first section of said tank,
a second purified water passage connecting said first section of said tank to a location where purified water is to be drawn for use,
waste water passage means for connecting said waste water outlet of said reverse osmosis filter to said second section of said tank for causing waste water in said second section to exert pressure on purified water in said tank through said movable member for forcing purified water out through said second purified water passage,
a second valve means for controlling the flow of waste water from said filter to said second section of said tank through said waste water passage means,
restricted passage means for draining waste water from said reverse osmosis filter and from said tank,
and valve operating means for opening and closing said first and second valve means,
said valve operating means including hydraulically operated means responsive to the pressure of purified water in said first section of said tank for closing said first valve means when said first section of said tank has received a predetermined amount of purified water.

2. A device as recited in claim 1 in which said means for closing said first valve means is responsive to the pressure of said purified water in said first section of said tank which is generated when said first section occupies substantially the entire volume of said tank.

3. A water purifying device comprising
a reverse osmosis filter having an inlet for water to be purified, a purified water outlet and a waste water outlet,
a tank,
a movable member in said tank for dividing said tank into a first section and a second section of variable volumes,
means for connection to a source of water under pressure for conducting water to said inlet of said reverse osmosis filter,
a first valve means for controlling the flow of water to said inlet,
a first purified water passage connecting said purified water outlet of said reverse osmosis filter to said first section of said tank,
a second purified water passage connecting said first section of said tank to a location where purified water is to be drawn for use,
waste water passage means for connecting said waste water outlet of said reverse osmosis filter to said second section of said tank for causing waste water in said second section to exert pressure on purified water in said tank through said movable member for forcing purified water out through said second purified water passage,
a second valve means for controlling the flow of waste water from said filter to said second section of said tank through said waste water passage means,
restricted passage means for draining waste water from said reverse osmosis filter and from said tank,
and valve operating means for opening and closing said first and second valve means, said valve operating means including hydraulically operated means for closing said first valve means when said first section of said tank has received a predetermined amount of purified water, said hydraulically operated means for closing said first valve means including a duality of pressure responsive members one of which is in communication with said means for connection to a source of water under pressure and when closed blocks the flow of water from said source, and the other of which is in communication with said first section of said tank, said one pressure responsive member being movable in response to pressure in said one section of said tank and including means for engaging said other pressure responsive member for causing the closing of said other pressure responsive member.

4. A device as recited in claim 3 in which said valve operating means includes a control valve in said second purified water passage for controlling the flow of purified water therethrough, said control valve when closed allowing said first section of said tank to become pressurized from purified water from said first purified water passage, whereby pressure can be transmitted to said one pressure responsive member for so moving said one pressure responsive member.

5. A device as recited in claim 4 in which said second valve means is hydraulically operable, and
said valve operating means includes,
a second control valve,
and hydraulic means connecting said second control valve and said second valve means for operating said second valve means in response to operation of said second control valve.

6. A device as recited in claim 5 in which each of said control valves includes,
a poppet,
a valve seat,
and resilient means biasing said poppet to a position of engagement with said seat,
said poppets being in a side-by-side relationship,
said valve operating means including,
a single manually operable actuating member,
and cam means for moving said poppets off said seats in response to actuation of said actuating member.

7. A device as recited in claim 6 in which said cam means includes,
a rotary member, and
a rotationally fixed member,
said rotationally fixed member being engageable with said poppets,
said rotary member and said rotationally fixed member having interengageable cam surfaces for causing linear movement of said rotationally fixed member upon rotation of said rotary member.

8. A device as recited in claim 7 in which said cam surfaces include at least one protrusion in said rotationally fixed member, and a surface defining a recess in said rotary member for receiving said protrusion.

9. An arrangement for providing purified water upon demand comprising
a reverse osmosis filter having
an intake,
a product water outlet for discharging purified water,
and discharge means for discharging unpurified water,
inlet means for connecting said intake of said reverse osmosis filter to a source of pressurized water,
a first valve in said inlet means for controlling the flow of water therethrough,
a tank,
movable means in said tank separating said tank into a first section and a second section, means connecting said product water outlet and said first section for transmitting purified water to said first section,
product water outlet means connected to said first section for transmitting purified water out of said tank,
a first unpurified water passage communicating with said discharge means and said second section of said tank for conducting unpurified water from said reverse osmosis filter to said second section of said tank for exerting pressure on said movable means and causing said movable means to force purified water from said product water outlet means,
a second valve controlling the flow through said first unpurified water passage means,
a first drain passage communicating with said first unpurified water passage means downstream of said second valve means for discharging unpurified water from said second section of said tank,
a first flow restrictor in said first drain passage,
a second unpurified water passage means communicating with said discharge means,
a second drain passage communicating with said second unpurified water passage means for discharging unpurified water therefrom,
a second flow restrictor in said second drain passage,
and valve operating means for operating said first and second valves,
said valve operating means including,
a manually operable member,
means responsive to operation of said manually operable member for opening and closing said second valve,
and hydraulic means responsive to operation of said manually operable member for opening and closing said first valve,
said hydraulic means including,
pressure responsive means for opening said first valve immediately upon operation of said manually operable member, and
pressure responsive means for closing said first valve in response to the generation of a predetermined pressure by said purified water in said first section of said tank when said purified water occupies substantially the entire volume of said tank.

10. An arrangement for providing purified water upon demand comprising
a reverse osmosis filter having,
an intake,
a product water outlet for discharging purified water,
and discharge means for discharging unpurified water,
inlet means for connecting said intake of said reverse osmosis filter to a source of pressurized water, a first pressure operable valve in said inlet means for controlling the flow of water therethrough, a tank, movable means in said tank separating said tank into a first section and a second section, means connecting said product water outlet and said first section for transmitting purified water to said first section, product water outlet means connected to said first section for transmitting purified water out of said tank, a first unpurified water passage communicating with said discharge means and said second section of said tank for conducting unpurified water from said reverse osmosis filter to said second section of said tank for exerting pressure on said movable means and causing said movable means to force purified water from said product water outlet means, a second pressure operable valve controlling the flow through said first unpurified water passage means, a first drain passage communicating with said first unpurified water passage means downstream of said second valve means for discharging unpurified water from said second section of said tank, a first flow restrictor in said first drain passage, a second unpurified water passage means communicating with said discharge means, a second drain passage communicating with said second unpurified water passage means for discharging unpurified water therefrom, a second flow restrictor in said second drain passage, and valve operating means for operating said first and second valves, said valve operating means including, a manually operable member, a duality of control valves, said control valves being substantially simultaneously opened and closed by said manually operable member, means responsive to operation of said manually operable member for opening and closing said second valve, said last mentioned means including a first pressure-transmitting means for providing communication between one of said control valves and said second valve, and hydraulic means responsive to operation of said manually operable member for opening and closing said first valve, said hydraulic means including a second pressure-transmitting means for providing communication between the other of said control valves and said first valve.

11. A device as recited in claim 10 in which said one control valve is in said product water outlet means for controlling the discharge of purified water from said tank as well as controlling the pressure signal to said first valve.

12. A device as recited in claim 11 in which said manually operable member includes means for opening said one control valve slightly before the opening of said other control valve.

13. An arrangement for providing purified water upon demand comprising a reverse osmosis filter having, an intake, a product water outlet for discharging purified water, and discharge means for discharging unpurified water, inlet means for connecting said intake of said reverse osmosis filter to a source of pressurized water, a first valve in said inlet means for controlling the flow of water therethrough, said first valve including, an inlet, an outlet, a valve seat between said inlet and said outlet, a first movable member for engaging said valve seat, a first chamber means on the side of said first movable member remote from said valve seat, a second movable member communicating with said first chamber means, and movable toward and away from said first movable member, a second chamber means on the side of said second movable member remote from said first movable member, said second movable member providing a first displacement area in said first chamber means and a second displacement area in said second chamber means, said second displacement area being greater than said first displacement area, said first movable member having an opening therethrough providing communication between said first chamber means and said outlet, an element on said second movable member engageable with said first movable member at said opening for closing the same, and restricted opening means providing communication between said inlet and said first chamber means, said hydraulic means including, passage means providing communication between said second chamber means and said first section of said tank for causing movement of said second movable member in response to pressure in said first section of said tank so that said element engages said first movable member at said opening and pressure is communicated to said first chamber means through said restricted opening means for moving said first movable member against said valve seat for closing said first valve.

14. A device as recited in claim 13 in which said valve operating means includes a control valve in said product water outlet means for selectively controlling the flow therethrough, said passage means of said hydraulic means being connected to said product water outlet means upstream of said control valve so that pressure can build up in said second chamber means when said control valve is closed, and pressure in said second chamber means is relieved when said control valve is open for permitting pressure in said first chamber means to move said second movable member away from said first movable member to open said outlet in said first movable member, whereby pressure is relieved in said first chamber means and pressurized water in said inlet moves said first movable member to a position remote from said valve seat for thereby opening communication through said first valve, said control valve being operable by said manually operable member.

15. A device as recited in claim 14 in which said second valve includes,
an inlet,
an outlet,
a valve seat between said inlet and said outlet,
a movable member engageable with said valve seat for closing said second valve,
a chamber means on the side of said movable member remote from said valve seat,
and restricted opening means providing communication between said inlet and said chamber means,
and said valve operating means includes,
a drain passage means connected to said chamber means of said second valve,
and a second control valve in said drain passage means of said valve operating means for relieving pressure in said chamber means of said second valve when said second control valve is open so that pressure in said inlet of said second valve can move said movable member of said second valve against said valve seat of said second valve, and for allowing water to bleed through said restricted opening means into said chamber means of said second valve and build up pressure therein when said second control valve is closed, for moving said movable member against said valve seat for closing said second valve,
said second control valve being operable by said manually operable member.

16. A device as recited in claim 13 in which said second movable member extends across said second chamber means, said passage connecting to said second chamber means on one side of said second movable member, said second chamber means having a bleed opening providing an outlet on the opposite side of said second movable member.

17. A device as recited in claim 16 in which said manually operable member opens said first mentioned control valve slightly ahead of said second control valve.

* * * * *